(No Model.) 3 Sheets—Sheet 1.
G. W. LACY.
TRUCK FOR MOTOR CARS.
No. 503,092. Patented Aug. 8, 1893.
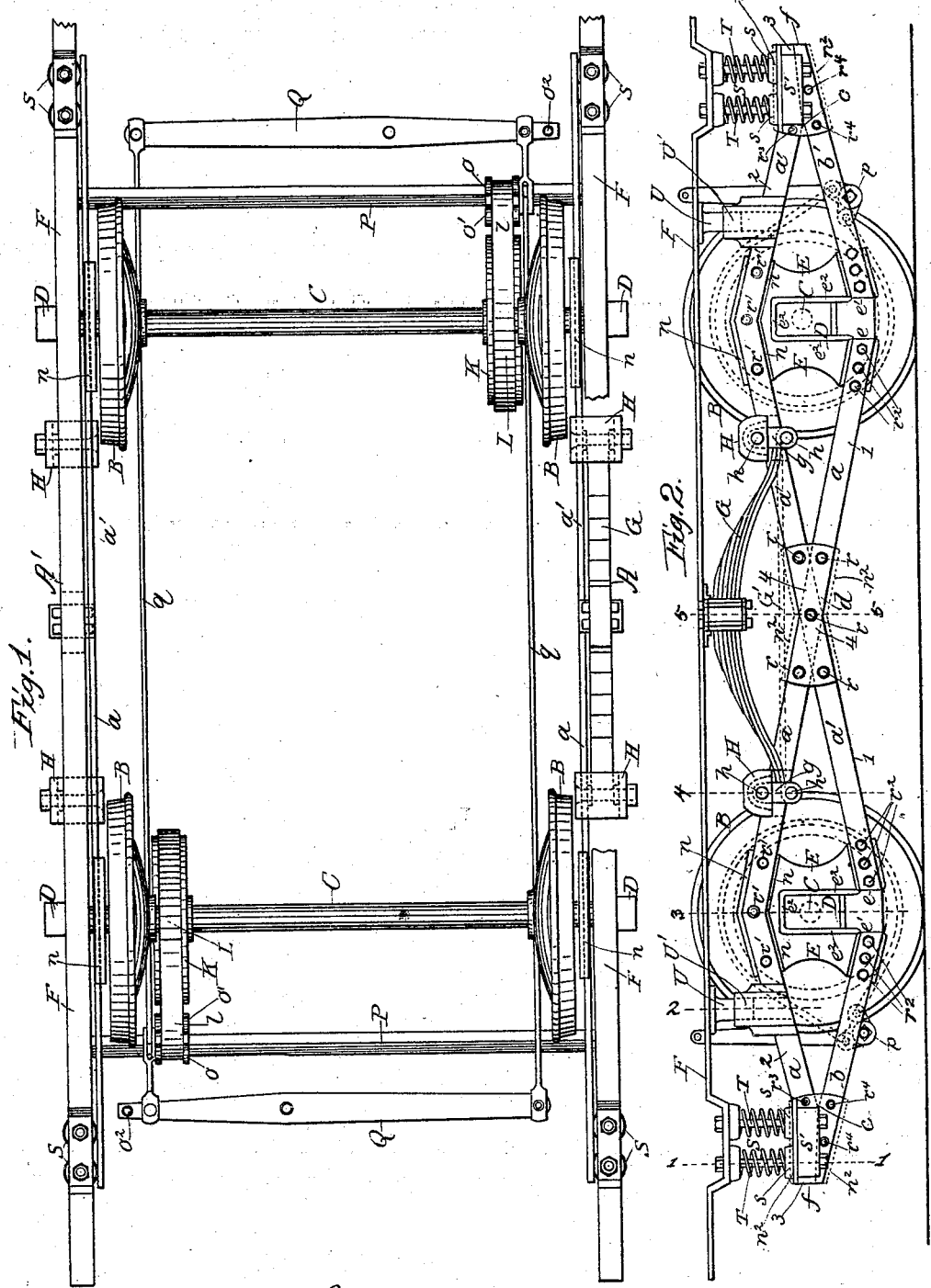
Witnesses. Charles Siekuf
A. Selkirk Jr.
George W. Lacy.
Inventor
by Alex. Selkirk
Attorney

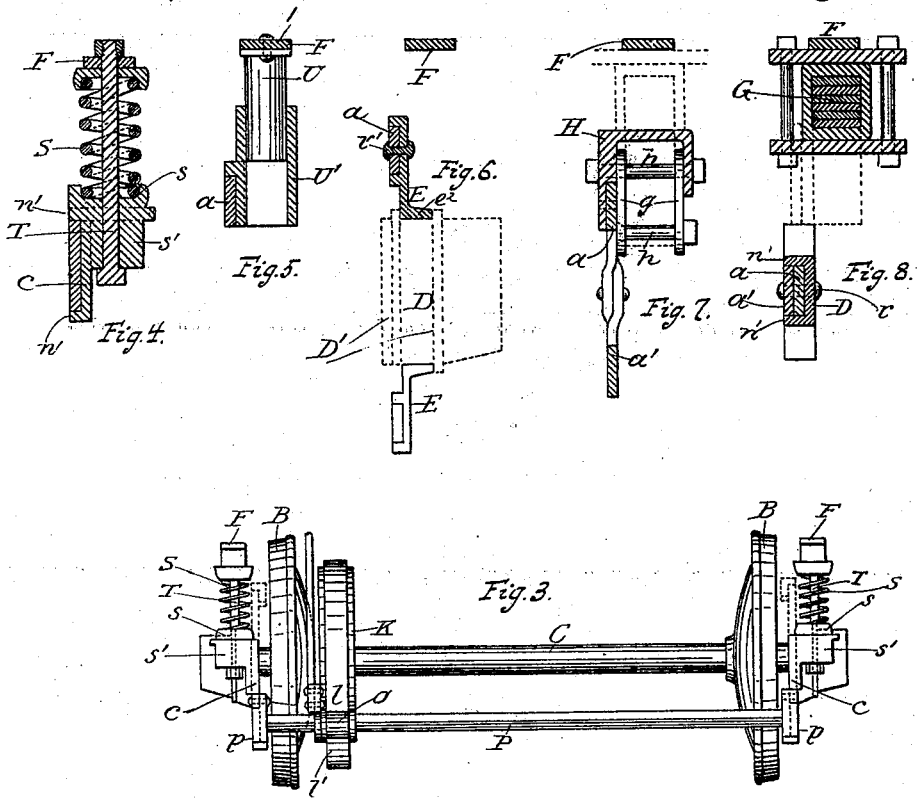

(No Model.) 3 Sheets—Sheet 3.
G. W. LACY.
TRUCK FOR MOTOR CARS.
No. 503,092. Patented Aug. 8, 1893.
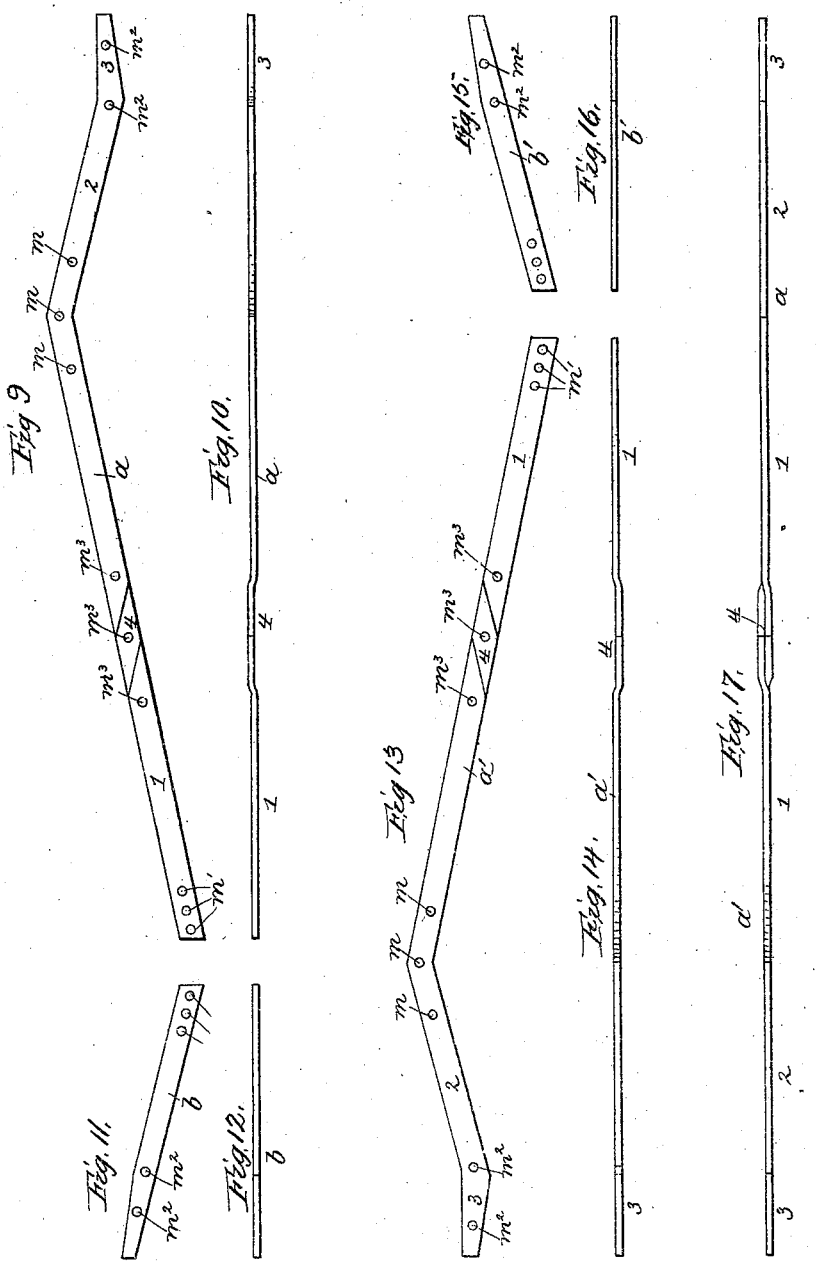
Witnesses. Charles Seekuh
A. Selkirk Jr.
George W. Lacy
Inventor,
by Alex. Selkirk
Attorney

UNITED STATES PATENT OFFICE.

GEORGE W. LACY, OF KINGSTON, NEW YORK, ASSIGNOR, BY MESNE ASSIGNMENTS, TO ELZADA LACY, OF SAME PLACE.

TRUCK FOR MOTOR-CARS.

SPECIFICATION forming part of Letters Patent No. 503,092, dated August 8, 1893.

Application filed November 8, 1892. Serial No. 451,301. (No model.)

*To all whom it may concern:*

Be it known that I, GEORGE W. LACY, a citizen of the United States, residing at Kingston, in the county of Ulster and State of New York, have invented certain new and useful Improvements in Trucks for Electric-Motor Cars; and I do hereby declare the following to be a full, clear, and exact description of the invention, such as will enable others skilled in the art to which it appertains to make and use the same.

My invention relates to improvements in trucks for cars driven by their own motors, and in which both the motor and the load, offering resistance to the power of the motor, co-operate to so affect the union of the parts of the same as to quickly impair the strength of the same and in a comparatively short time destroy the truck frame or necessitate repairs to be often made in the same; and it consists in the combinations of elements and parts hereinafter described and specifically set forth in the claims.

The objects of my invention are, first, to provide for trucks of motor cars a frame of truss form character in which duplicate members, made of flat bars of steel, bent at corresponding angles and with the long limbs of each crossing the other, are secured to each other and to co-acting plates by hot riveted rivets so as to produce within the truck frame three distinct truss sections; second, to provide in a frame of a truck of a motor car a triple truss in which the ends and center portions of the same will react each against the other, when the truck is in service, and prevent sagging of parts; third, to provide, in a triple truss frame, bearings for an equalizing spring which is located between the axles of the truck wheels and transfers the weight of the load to the truck frame, at points neighboring the housing of the axle journal; fourth, to provide in a truck frame a triple truss, an equalizing spring, suspended by its ends from the corresponding members of the opposite end truss portions of the frame, which receive the housings of the axle journals, and steadying springs which are supported from the opposite ends of the truck frame so that the load brought on the truss frame will be suitably distributed on the same in its middle and end portions without liability of deflecting the same from their original lines; fifth, to provide with the truss form frame and the longitudinal bar on which the body of the car is seated and secured, an equalizing spring, relatively between the housings of the axle journals, steadying springs at the opposite ends of the truck frame and between them and said longitudinal bar, and vertically moving guide posts and ways also between said truck and the said longitudinal bar and which receive and transfer the pushing force from the truck to the body of the car or the horizontal bar on which the body of the car is seated; sixth, to combine with the truck frame and axles of the drive wheels a friction brake band which may at will be tightened for governing the revolution of the said wheels; and finally to provide combinations of devices and elements whereby my improvements may be embodied in trucks of motor cars. I attain these objects by the means illustrated in the accompanying drawings forming a part of this specification, in which—

Figure 1 is a plan view of a truck embodying the improvements in this invention. Fig. 2 is a side elevation of the same. Fig. 3 is an end view of the same. Fig. 4 is a sectional view at line 1 in Fig. 2. Fig. 5 is a sectional view at line 2 in Fig. 2. Fig. 6 is a sectional view at line 3 in Fig. 2. Fig. 7 is a sectional view at line 4 in Fig. 2. Fig. 8 is a sectional view at line 5 in Fig. 2. Fig. 9 is a side view of one of the principal members of the truck frame. Fig. 10 is an edge view of the same. Fig. 11 is a side view of one of the minor members of the same frame. Fig. 12 is an edge view of the same. Fig. 13 is a side elevation of the other principal member of the truck frame. Fig. 14 is an edge view of the same. Fig. 15 is a side view of the other minor member of the frame. Fig. 16 is an edge view of the same; and Fig. 17 is an edge view of the principal members of the frame when together in place, and secured with each other and the other members of the frame.

The same letters and figures of reference refer to similar parts throughout the several views.

In the drawings A represents one of the side frames of the truck of a motor car, and A' is the opposite side frame. Each of these side frames is a duplicate of the other, being composed of similar parts having each a similar form of construction and arrangement in the said side frames.

B B are the wheels, C C are the axles, D D are the housings of the journals of said axles and E E are the pedestals holding the housings in place.

As before stated the frames A A' of the respective sides of the truck are each composed of similar parts constructed, arranged and secured in each frame as in the other, and hence a description of the parts in one of the said side frames will serve for the other. The side frame A is composed of the principal members $a\ a'$ and minor members $b\ b'$, pedestals E E, end tie-plates $c\ c$ and middle tie-plate $d$, Fig. 2. The principal members $a\ a'$ and minor members $b\ b'$ are made from flat bar metal, and preferably of steel bars of width from three to four inches, more or less, and of thickness from three quarters of an inch to one and one eighth inches, more or less, according to the service in which the truck is to be employed. The members $a\ a'$ are each of a length sufficient to extend from the jaw $e$ of the respective pedestals toward and past the other pedestal to the end of the frame, as to point $f$ and in their continuity they each include the limbs 1, 2 and 3 and offset 4 as shown in Figs. 2, 11, 12, 15, 16 and 17. The limbs 1 and 2 of the said members $a\ a'$ are at an angle with each other as shown, and limbs 3 are preferably made at an angle with limb 2. The offsets 4 in each of the said members $a\ a'$ occur in the portion of limb 1 which coincides with the middle of the distance between the centers of the axles C C, when said members are secured in place in the frame. The minor members $b\ b'$ are made each with a length sufficient to extend from jaw $e'$ of the respective pedestals to the outer ends of the frame as to points $f$. These several members $a\ a'$, $b\ b'$ are suitably perforated preferably by drilling for receiving the rivets by which they, respectively, are to be secured in place in the frame.

The pedestals E E are preferably made of malleable iron, or cast cast steel, or of wrought iron or steel or other suitable metal with a thickness of about one half an inch, more or less, and having their jaws $e\ e'$ strengthened and widened by flanges $e^2$, Figs. 2 and 6, which flanged jaws work between the ways or flanges D' indicated by dotted lines in Fig. 6 made with the housings D. The top portions of the webs of these pedestals are suitably perforated, preferably by drilling to correspond in place and size with the perforations $m$ in the members $a\ a'$, and the lower ends of the horns at jaws $e$ are suitably perforated at places and with size corresponding with perforations $m'$ in the said members $a\ a'$. The tie plates $c\ c$ are also made of suitable metal, and preferably of malleable iron, or cast-cast steel, and are provided with suitable perforations, corresponding with the perforations $m^2$ made in the outer end portions of the members $a\ a'$, $b\ b'$ with which the said tie plates $c\ c$ are secured. These tie plates $c\ c$, Figs. 2, 3 and 4, are shown to have integral with them spring cups $s$ and guide bracket $s'$, receiving the spring tie bolt T holding the bolster bar F and springs S in place in relation to the frame. The middle tie plate $d$ is also made of some strong metal such as wrought or malleable iron or cast-cast steel and so formed as to nicely fit against the face sides of the crossed portions of the limbs 1 1 of the principal members $a$ and $a'$ of the frame, as against the offsets 4; they are provided with perforations corresponding with the perforations $m^3$ in the middle portion of the limbs 1 of the said principal members $a\ a'$ of the frame. In combining together the said several members of this frame, the principal members $a$ and $a'$ are so arranged, placed and secured together that the respective long limbs 1 of the said members $a\ a'$ will cross each other at the middle of their lengths, or at the center of length of the frame, as at their respective offsets 4, when limb 2 of the member $a$ and the upper half portion of limb 1 of the same member will form an angular form of arch at one pedestal in one half of the frame and the limb 2 and upper half portion of limb 1 of member $a'$ will form a similar angular form of arch at the other pedestal in the other half portion of the frame, as shown in Fig. 2. After the limbs 1. 1. of the members $a\ a'$ have been placed crossing each other at offset 4, the tie plate $d$ is placed in position and suitably secured by any known means to the said members, yet preferably by rivets $i\ i$ driven and headed red hot in the holes provided as described. The pedestals E E are also put in place and are secured at their upper ends with conjoined limbs 1 and 2 of the respective members $a\ a'$, preferably by means of rivets $i'\ i'$ driven and headed red hot, while the terminal ends of the limbs 1 of each of the said members $a\ a'$ are secured to the lower end of the inner horn of the respective pedestals E, as at jaws $e$ in each pedestal, preferably by rivets $i^2\ i^2$ also red hot driven and headed. The minor members $b\ b'$ of this frame are also put in place with their lower or inner ends secured to the lower ends of the outer horns of the said pedestals as at their respective jaws $e'$, and with their outer ends joining with the outer ends of the limbs 2 of the members $a\ a'$, and secured together and with the tie plates $c\ c$ as shown in Fig. 2, while rivets $i^3\ i^4$ driven and headed red hot, in the holes provided as described, are employed as the preferred means for securing the said parts and pieces together in the frame.

When the several bar form members $a\ a'$, $b\ b'$, tie pieces $c\ c$ and $d$ and pedestals E E are placed and secured together as above described and as shown in the drawings, there is produced a frame of great strength to endure strain, weight and service, and one in which all the members will retain, under all strains generally incidentally had in truck frames of motor cars, their normal or original condition of place and relative lines of arrangement of parts and pieces. In this frame, constructed of parts and elements above described, there are produced three trusses, two being of a diamond form, one at each pedestal, and the third having an X form occurring between the housing of the journals of the axles of the truck, as shown in Fig. 2.

The pedestals E E are shown to be provided with flanges $n$ $n$, nicely receiving between them the members $a$ $a'$ $b$ $b'$ as shown, and the tie pieces $c$ $c$ and $d$ may also be provided with similar flanges as $n'$ $n'$ shown respectively in Figs. 4 and 8, and indicated by dotted lines $n^2$ in Fig. 2, for receiving in like manner between them the portions of the members $a$ $a'$ $b$ and $b'$ the said tie pieces are to hold together by means of the rivets $i$ $i'$ $i^2$ $i^3$ $i^4$ as above described.

G is an equalizing spring arranged in each of the said side frames so as to have place in the middle portion of the frame and between the horizontal bolster bar F above and the central or X form truss portion of the frame occurring between the pedestals E E. This equalizing spring may be made with any known suitable form of construction, say as that of a spiral, volute or rubber spring, yet preference is given to the employment of an elliptic spring or a half elliptic spring made of steel bars substantially as shown in Fig. 2 in which this spring G is supported and connected at its ends with the members $a$ $a'$ of the frame by means of links $g$ $g$, Figs. 1, 2 and 7, suspended by suitable bolts $h$ $h$ from brackets H H secured to the said members of the frame by suitable means and preferably by rivets driven and headed while red hot. Bolts $h$ $h$ passing through the said links and the eyes in said springs hold the latter secure with the frame. When this spring is made with a spiral or with the other forms mentioned, I would employ one or more with an equalizing bar, indicated by dotted lines G', secured to the members $a$ $a'$ of the frame in a manner substantially as the equalizing spring G is secured, and between the bolster bar F as indicated by dotted lines in Fig. 2.

In the opposite ends of the frames A A' and between them and the bolster bars F are arranged the springs S S, which springs are held between the pieces $s$ $s$ secured respectively to the said frames and the bolster bars F and held in place by suitable spring tie bolts T in the manner generally practiced.

U U are vertical pins secured to the bolster bars F F by bolts or rivets and working in sleeves U' U' secured to the frames A A' at points preferably between the end springs S and pedestals E of the frame. Through these pins U U and their coacting sleeves U' U' the push of the frame of the truck is communicated from the wheels of the motor to the car which the truck carries. These pins and their sleeves relieve the springs S and the equalizing springs from all strain from pushing or thrusting, and leaves the said springs to receive only the weight of the car and its load.

In service, the weight on the equalizing spring, or the above described equalizing bar and spring, reacts against the weight on the end springs S S to prevent an excessive rocking of the body of the car in direction of its length, and the tying of the several truss cords in the manner described, by the pedestals, tie plates and rivets driven and headed red hot, prevents any movement or shifting of the members $a$, $a'$, $b$, $b'$ of the frame and imparts to the several portions of the same, strength and endurance which wholly obviates all liability of the pieces shifting, bending or being in the least changed from their original lines of arrangement and places in the frame. These frames in the truck allow them to be readily lifted free from the housings of the axle journals and obviates the necessity of using tying bars or other devices for preventing the jaws of the pedestals from spreading.

Having described my invention, what I claim, and desire to secure by Letters Patent, is—

1. In a truck, the combination with the housings of the axle journals of the truck wheels of side frames A and A' each containing within its length two diamond form trusses, located one at each pedestal in the frame and an X form truss located in the middle portion of each frame and between the said housings, the said frames being formed of the members described, arranged and secured together substantially as and for the purposes set forth.

2. In a truck, a side frame composed of bars $a$ $a'$ provided each with angular limbs 1 and 2, and crossing each other at the middle of the length of the frame, bars $b$ $b'$, pedestals holding the housings of the axle journals and tie pieces $c$ $c$ the said members being secured together substantially as and for the purposes set forth.

3. In a truck, a side frame formed by the combination with the pedestals receiving the housings of the axle journals, of the bars $a$ $a'$ secured each to the upper portion of the web of a pedestal with one limb of each said bars extending, after crossing that of the other, to the inner horn of the other pedestal and secured thereto, with the other limbs of the same bars extended to the respective ends of the frame, and the bars $b$ $b'$ secured respectively to the outer horns of the pedestals and the outer end limbs of said bars $a$ $a'$ and all secured together by tie plates $c$ $c$ and rivets which are headed on both sides, substantially as and for the purposes set forth.

4. In a frame of a truck, the combination with the crossed members $a$ $a'$ having their respective limbs 2 bent at an angle with limbs 1 and extended each to the end of the frame, and the members $b$ $b'$ arranged each at an angle with the respective limbs 2 of the said members $a\ a'$, of the pedestals E E, the tie pieces $c\ c$ and $d$, and rivets driven and headed red hot, and securing the said members and pedestals and tie pieces together, substantially as and for the purposes set forth.

5. In a frame of a truck, the combination with the members $a\ a'$ and $b\ b'$ formed and arranged in relation to each other as above described, of pedestals E E made of tough metal described and provided with flanges $n\ n$, the tie pieces $c$ and $d$ also made of similar metal and provided with flanges $n'\ n'$, and rivets which are headed while red hot, substantially as and for the purposes set forth.

6. In a truck, the combination with the side frames A A' each composed of the members above described and containing within its length two diamond form trusses, one at each pedestal, and an X form truss midway between the said pedestals, and the horizontal bolster bars F F, of the equalizing springs between the said bolster bars and the portions of the said side frames between their pedestals, and the end springs between the end portions of the said bolster bar and ends of the side frames, substantially as and for the purposes set forth.

7. In a truck, the combination with the side frames A A' each constructed of members as described, and containing at each pedestal a diamond form truss and having an X form truss midway between the said pedestals, the bolster bars F F, equalizing springs G and end springs S S, of the vertical pins U U and their coacting sleeves U' U' secured to said bolster bars and frames, substantially as and for the purposes set forth.

In testimony that I claim the invention above set forth I affix my signature in presence of two witnesses.

GEORGE W. LACY.

Witnesses:
W. G. ERTZ BERGER,
JAMES B. CAMERON.